May 16, 1944.   E. MERTEN   2,349,186
SENSITIVITY CONTROL FOR SEISMIC RECORDING
Filed Aug. 31, 1942   2 Sheets-Sheet 1
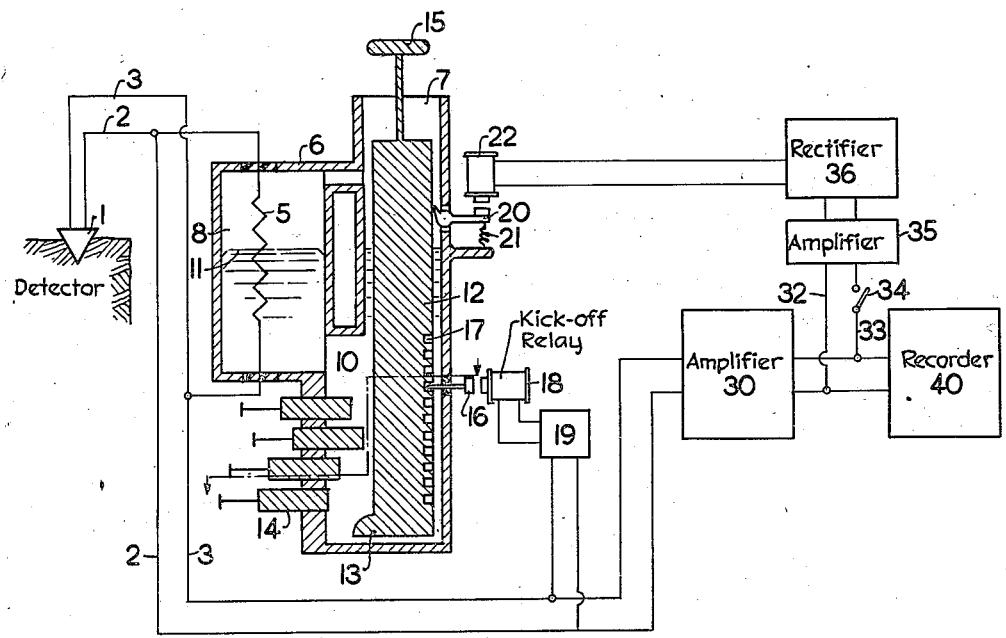
Fig. I
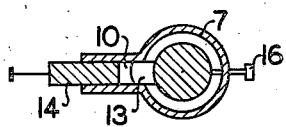
Fig. II
Inventor: Eugen Merten
By his Attorney:

May 16, 1944.    E. MERTEN    2,349,186
SENSITIVITY CONTROL FOR SEISMIC RECORDING
Filed Aug. 31, 1942    2 Sheets-Sheet 2
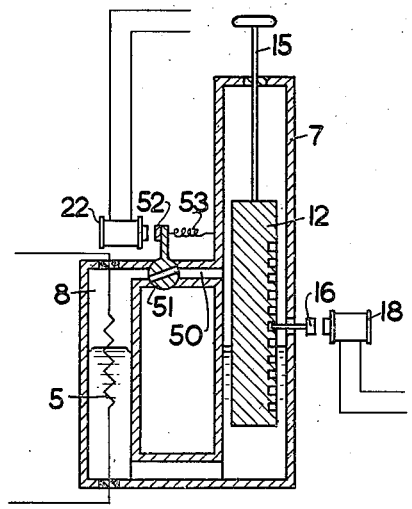
Fig. III
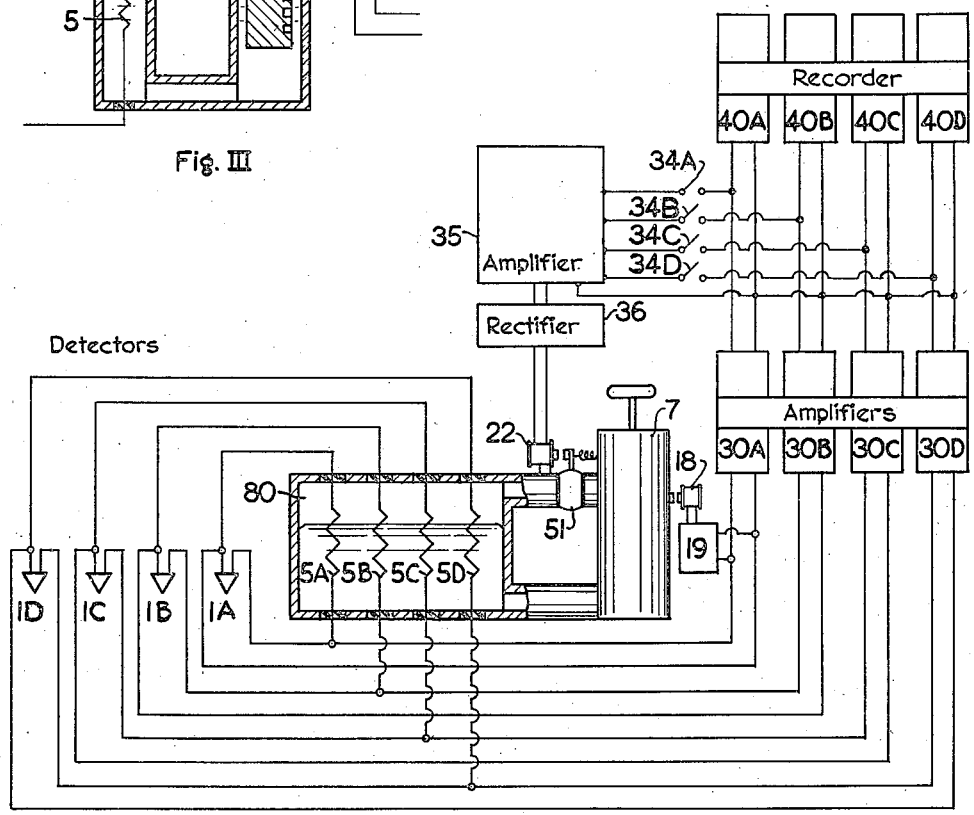
Fig. IV
Inventor: Eugen Merten
By his Attorney:

Patented May 16, 1944

2,349,186

UNITED STATES PATENT OFFICE 2,349,186

SENSITIVITY CONTROL FOR SEISMIC RECORDING

Eugen Merten, Houston, Tex., assignor to Shell Development Company, San Francisco, Calif., a corporation of Delaware Application August 31, 1942, Serial No. 456,842

6 Claims. (Cl. 177—352)

This invention pertains to the art of seismic exploration, and relates more specifically to methods and circuit means for controlling without distortion the amplitude of the oscillations recorded on a seismogram.

Seismic exploration normally consists in translating the mechanical energy of seismic waves artificially generated in the ground into electric impulses by means of a plurality of detectors, amplifying said impulses by means of electronic amplifiers, and photographically recording said impulses by means of a recorder.

The magnitude of the impulses generated by the detectors in response to seismic waves travelling along substantially direct or minimum-time paths, or to waves reflected from shallow strata, is very much greater than that of the impulses generated in response to waves reflected from deep strata. Thus, the impulses generated at the beginning of a period of recording may be as much as ten-thousand times stronger than the impulses generated at the end of said period.

It becomes therefore necessary to compensate for this disproportion by reducing the sensitivity of the seismic recording system at the beginning of a recording period and by increasing it towards the end of said period in such a manner as to obtain a substantially uniform amplitude of recorded oscillations on the seismogram, whereby the latter may be easily deciphered and interpreted.

The desired sensitivity control may be achieved in different ways, for example, by varying the amplification gain of the amplifier or amplifiers, which is usually effected by applying to the latter a varying negative grid bias.

The desired sensitivity control may furthermore be effected either as a function of time, in so-called semi-automatic control systems, or a function of the intensity of the impulses generated by the detectors, in so-called fully automatic control systems.

These methods are, however, subject to certain drawbacks.

Thus, all grid-bias amplification gain control systems regulate signals or impulses that have already penetrated a portion of the amplification circuit, and operate therefore at times at an energy level which may be higher than desirable.

The effectiveness of semi-automatic control methods in particular is impaired by the fact that the average amplitude or amplitude level of the impulses or oscillations may decrease as a time function substantially different from that according to which the compensating increase in the sensitivity of the system has been pre-set.

In most fully automatic systems a strong impulse may temporarily reduce the sensitivity of the system to such an extent that an equally strong impulse arriving at a slightly later time will be recorded as a much weaker one, thus distorting the true nature of the seismogram.

It is therefore an object of this invention to provide a seismograph sensitivity control system wherein the sensitivity is made to increase as a predetermined controllable function of time.

It is also an object of this invention to provide a seismograph sensitivity control method wherein the sensitivity is made to increase throughout a period of time between an initial and a final value as a function of time, while the rate of said increase is controlled as a function of the intensity or energy level of the impulses or signals generated by the detector.

It is also an object of this invention to provide a seismograph sensitivity control system wherein said sensitivity remains substantially constant so long as the magnitude or energy of the impulses generated by the detector is above a predetermined value or level, but increases when said magnitude falls below said predetermined value, the rate of said sensitivity increase being a function of said magnitude decrease.

It is also an object of this invention to provide a device for controlling the sensitivity of seismograph systems wherein the impulses generated by the detector are transmitted to the amplifier and simultaneously shunted through a resistance, the value of said resistance being subject to control as a function of time, and the rate of change of the value of said resistance being subject to control as a function of the magnitude of said impulses.

It is also an object of this invention to provide a seismograph sensitivity control system wherein the magnitude or strength of the detector impulse or signal is regulated or modified before said impulse enters any part of the amplification system, which permits the system to operate at a relatively low energy level, and facilitates the selection and matching of the various elements of said system, such as tubes, transformers, choke coils, etc.

These and other objects of the present invention will be understood from the following description taken with reference to the attached drawings wherein:

Fig. 1 shows an embodiment of the present sensitivity control system in application to a single-channel seismograph circuit;

Fig. 2 is a plan view in cross-section of the controller shown in Fig. 1;

Fig. 3 is a cross-section view of another embodiment of the controller; and

Fig. 4 is a circuit diagram showing the present invention in its application to a multi-channel seismic recording system.

Referring to the drawings, Fig. 1 shows for simplicity the present system in application to a single seismograph channel, that is, a circuit comprising a detector, an amplifier having any desired number of stages, and a recording galvanometer, it being understood that the invention is likewise applicable to multi-channel systems, and to systems comprising any desired numbers of detectors per channel, as will be shown later.

A detector 1, in contact with the ground, translates the seismic waves generated at a shot point, not shown in the drawings, into electric impulses, which are transmitted, through conductors 2 and 3, to an amplifier 30 and a recorder 40.

The conductors 2 and 3 are shunted by means of a resistance 5, such as a suitably selected carbon stick or wire resistor, held within a sensitivity controller 6.

The controller 6, as seen from Figs. 1 and 2, comprises a housing having a preferably cylindrical chamber 7, a chamber 8, containing the resistance 5, and a relatively restricted chamber or space 10, all three chambers being in communication with each other and being filled to a level 11 with mercury or any other suitable liquid conductor.

The chamber 7 accommodates a plunger or piston 12, buoyant in said liquid and adapted for vertical movement within said chamber.

The plunger 12 is provided at its lower end with a boot or nose 13, adapted for motion within the restricted chamber 10.

A plurality of adjustable slides 14 are fitted through the walls of the housing and are adapted for horizontal movement within chamber 10 in such a manner that a desirable clearance may be provided between said slides and the boot 13.

The plunger 12 may be forced downwards by means of a handle 15, and is held against the buoyant action of the mercury or liquid in cylinder 7 by means of a latch or pin 16, adapted to register with any of a plurality of holes 17 provided in the plunger, whereby said plunger may be adjusted to any desired degree of immersion in the liquid at the start of the operations.

A relay coil 18, fed from an amplifier 19, which is tapped across the conductors 2 and 3, is adapted to exercise a magnetic pulling action on the pin 16, thereby releasing the plunger 12.

A braking mechanism 20 for the plunger 12 is fitted through the walls of the housing 7, but is normally held out of contact with the plunger 12 by a spring 21.

The conductors 2 and 3 are tapped across the circuit, for example, between the amplifier 30 and the recorder 40, by wires 32 and 33 provided with a switch 34, whereby the output of the amplifier 30 may be passed to a second amplifier and volume control circuit 35. The A. C. output of amplifier 35 is applied to a rectifier 36, such as a full-wave vacuum tube rectifier or a copper oxide rectifier, and the D. C. output of the rectifier 36 is in turn fed to a relay coil 22, arranged in such a manner as to overcome or oppose the effect of the spring 21 on the braking mechanism 20, whereby a controllable braking action is exercised against the plunger 12.

The sequence of operations of the present system is as follows:

Preliminary to firing the shot, the plunger 12 is forced to its starting position, thereby raising the level of the mercury until the resistance 5 shunts the circuit to the proper starting sensitivity.

When the shot is fired, the first strong seismic waves arrive at detector 1 and are translated thereby into strong electric impulses, which are transmitted through conductors 2 and 3 to the amplifier 30 and recorder 40. Since, however, the resistance 5 has at this time a small value due to the shunting action of the mercury in which it is immersed, a large part of the energy generated at this time by the detector 1 is bypassed through said resistance, and only a small part thereof reaches the amplifier and recorder, whereby the amplitude of the recorded oscillations is kept at a desired low value.

The first impulse from the detector 1 is also transmitted to the kick-off amplifier 19 and relay 18, releasing the pin 16 and permitting the plunger 12 to be displaced upwardly by its buoyancy in the mercury.

As the plunger 12 ascends within the chamber 7, the level of the mercury in the channel 8 begins to fall, gradually uncovering the resistor 5 and thereby increasing the resistance of the shunt path to the impulses from the detector.

As the energy of the electric impulses generated by the seismic waves becomes in general less and less with time, the portion of said energy which is by-passed through the resistor 5 also becomes smaller and smaller with time, with the result that the energy reaching the amplifier 30 and recorder 40 is maintained at a fairly uniform level during the period of the upward motion of the plunger 12, giving a seismogram with a generally uniform amplitude of recorded oscillations.

The average level of the impulses generated by the detector does not, however, decay as a straight line function of time, nor as an exponential function thereof, but follows usually an irregular curve dependent on many variables, such as the nature and location of the various formations in a given locality, nature and amount of the explosive used, spacings between shot points and detectors, etc.

Since it is obviously desirable that the increase of the sensitivity of the present system should take place at rates approximating as closely as possible the variable rate of decay of the intensity of the impulses generated by the detector, in order that the recorded oscillations may be maintained at a suitably uniform amplitude by the compensating effect thus produced, the rate at which the mercury level in the chamber 8 is permitted to fall is regulated in the following manner:

As the plunger 12 moves upward by buoyancy within the cylinder 7, the place formerly occupied by said plunger is taken up mainly by the mercury which flows thereto from chamber 8 through the chamber 10. The passage for the mercury flow is restricted in said chamber 10 on one side by the adjustable slides 14 and on the other side by the boot 13 on the plunger 12, which moves past said slides together with the plunger.

By suitably adjusting said slides, therefore, a greater or smaller clearance may be provided between the boot 13 and the slides 14, thereby providing a passage for the mercury flow having a cross-section area which varies during the upward travel of the plunger 12 and boot 13. This makes it possible to control or to modify the rate of the mercury flow, and therefore the rate at which the effective resistance of the resistor 5 is caused to vary during the time of travel of the plunger 12.

Thus, in operating in known terrain or under conditions known from previous tests, it is possible to regulate the increase of the sensitivity of the present system as a predetermined function of time closely duplicating or approximating the function according to which it is anticipated that the energy of the impulses generated by the detector will generally decay during the period of recording.

When, however, it is not possible or not desirable to regulate the sensitivity of the present system as a fixed predetermined function of time, a fully automatic sensitivity control may be exercised in the following manner:

Preliminary to firing the shot, the switch 34 is closed, the slides 14 being left in any desired position, for example, all in or all out, or being even entirely dispensed with, as shown in the embodiment of Fig. 3.

The first impulses start the operation of the plunger 12 as before. These impulses are also transmitted to the amplifier and volume controller 35, which may be set to operate at a desired energy level. The A. C. output of the amplifier 35 is delivered to the rectifier 36, and the D. C. output of said rectifier is caused to energize the coil 22.

When strong electric impulses are being generated by the detector 1, these impulses, after amplification and rectification in the devices 30, 35 and 36, result in a relatively strong direct current which causes the coil 20 to overcome the action of the spring 21 and to arrest or restrain the upward movement of the plunger 12 by applying thereto the brake 20. During this period of reception of strong impulses, therefore, there is little or no upward motion of the plunger 12 or corresponding lowering of the mercury level, the system operating at substantially the original low sensitivity setting. When the average magnitude of the impulses, however, decays below a certain value, for example, below a level predetermined by the setting of the amplifier and volume control 35, the D. C. current obtained by rectifying these impulses becomes insufficient to maintain the plunger 12 stationary by means of the braking mechanism 20, and said plunger is permitted to ascend within the cylinder 7 at a rate regulated by the force applied by the braking mechanism and dependent therefore on the magnitude of the impulses originating in the detector.

Instead of using mechanical braking means to control the upward movement of the plunger 12, other means may be used to achieve the same result.

Thus, Fig. 3 shows a sensitivity control device similar to that of Fig. 1, except that the slides 14 and the boot 13 are omitted. The chamber 8 is closed except for a passage 50 which is in communication with the plunger cylinder 7, as shown in the drawings. The passage 50 is closed by a valve 51, having a magnetic metal element 52, which permits said valve to be closed, against the action of a spring 53, by a magnetic coil relay element 22, similar to the coil indicated by the same numeral in Fig. 1.

When the plunger 12 is released and begins to ascend within the cylinder 7, the level of the mercury in chamber 8 cannot fall, because of the vacuum effect in said chamber, unless the valve 51 is open. Strong rectified impulses from the detector, however, actuate the relay to close said valve against the action of the spring, in a manner generally described with regard to the operation of the braking mechanism of Fig. 1.

The mercury level is therefore not permitted to fall, and the sensitivity of the system is kept at a low value until the average magnitude or intensity of said impulses decreases below a predetermined value whereupon the spring 53 opens or partially opens the valve and admits air to the chamber 8, permitting the mercury to fall at a rate which is a function of the degree of aperture of the valve 51, and therefore of the magnitude of the current energizing the relay coil 22. The sensitivity of the system is thus raised until the amplified detector impulses again reach a predetermined value permitting them to operate the relay 22 and to close the valve, said process continuing throughout the recording of the seismogram.

Although the present invention has been shown and described above with regard to a single channel seismograph system, it is obvious that a sensitivity controller such as shown in Fig. 1 or 3 may be used in each channel of a multi-channel seismograph system, or, alternatively, that the sensitivity of all the channels of a multi-channel seismograph system may be regulated by means of a single controller comprising a plurality of shunt resistances.

A schematic diagram of connections used for multi-channel sensitivity control is shown by way of example with regard to a four-channel system in Fig. 4, wherein elements identical with those of Figs. 1 and 3 are designated by the same numerals.

Fig. 4 shows four detector 1A, 1B, 1C and 1D connected to amplifiers 30A, 30B, 30C and 30D and recorder or galvanometer strings 40A, 40B, 40C and 40D.

The four channels are shunted respectively by resistances 5A, 5B, 5C and 5D, placed together in a controller chamber 80 similar to the chamber 8 of Figs. 1 and 3.

The plunger within the controller cylinder 7 is released by the kick-off relay coil 18, operated through the amplifier 19 by an impulse originating in any of the detectors, for example, detector 1A as shown in the drawings.

The upward displacement of the plunger is controlled by the air valve 51, responsive to a relay coil 22, energized by the direct current from rectifier 35, which is in turn fed the A. C. impulses from the detector or detectors after their passage through amplifiers 30A–D and 35 in a manner generally similar to that described with regard to Figs. 1 and 3, switches 34A–D being provided to permit the amplifier and volume control 35 to be supplied with the impulses originating in some or all of the channels.

It will thus be seen that the present invention provides means for controlling the sensitivity of a seismic amplification system throughout a period of time as a function of time determined by a gradual lowering of the mercury level and a corresponding increase in the value of the resistances shunting the impulses generated by the detectors, whereas the rate of change of said sensitivity is further controlled as a function of the intensity of the electric impulses being recorded.

I claim as my invention:

1. In a seismograph system comprising in circuit a detector adapted to generate electric impulses, an amplifier adapted to amplify said impulses and a recorder adapted to record said impulses, a variable resistance shunting said circuit between the detector and the amplifier, time-responsive means for changing the value of said resistance between an initial and a final value during the period of recording of said impulses, and means responsive to the magnitude of the impulses originating in the detector for varying the rate of change of said resistance during said period of recording.

2. In a seismograph system comprising in circuit a detector adapted to generate electric impulses, an amplifier adapted to amplify said impulses and a recorder adapted to record said impulses, a sensitivity controller comprising a housing adapted to hold a liquid conductor body, a resistor immersed in said liquid and short-circuited thereby, said resistor shunting the seismograph circuit between the detector and the amplifier, means for gradually changing the level of said liquid, thereby modifying its short-circuiting effect on the resistor during the period of recording of said impulses, and adjustable control means for varying the rate of change of said liquid level during said period of recording.

3. In a seismograph system comprising in circuit a detector adapted to generate electric impulses, an amplifier adapted to amplify said impulses and a recorder adapted to record said impulses, a sensitivity controller comprising a housing adapted to hold a liquid conductor body, a resistor immersed in said liquid and short-circuited thereby, said resistor shunting the seismograph circuit between the detector and the amplifier, means for gradually changing the level of said liquid, thereby modifying its short-circuiting effect on the resistor during the period of recording of said impulses, and electrical relay means responsive to the magnitude of the impulses originating in the detector for controlling the rate of change of said liquid level during said period of recording.

4. In a seismograph system comprising in circuit a detector adapted to generate electric impulses, an amplifier adapted to amplify said impulses and a recorder adapted to record said impulses, a sensitivity controller comprising a housing adapted to hold a liquid conductor body, a resistor immersed in said liquid and short-circuited thereby, said resistor shunting the seismograph circuit between the detector and the amplifier, relay controlled means for gradually changing the level of said liquid, thereby modifying its short-circuiting effect on the resistor during the period of recording of said impulses, and means comprising a rectifier having its input connected to said circuit and its output connected to said relay means for varying the rate of change of said liquid level during said period of recording as a function of the magnitude of the direct current derived from rectifying in said rectifier the electric impulses originating in the detector.

5. In a seismograph system comprising in circuit a detector adapted to generate electric impulses, an amplifier adapted to amplify said impulses and a recorder adapted to record said impulses, a sensitivity controller comprising a housing adapted to hold a liquid conductor body, a plunger adapted for vertical motion within said housing, said plunger being buoyant in said liquid, locking means for maintaining said plunger immersed in said liquid, a resistor surrounded by said liquid and short-circuited thereby, said resistor shunting the seismograph circuit between the detector and the amplifier, relay means responsive to an impulse from the detector for releasing said locking means, whereby said plunger is permitted to rise through said liquid under the effect of buoyancy, and control means responsive to the magnitude of the impulses originating in the detector for regulating the rate of rise of said plunger, whereby the rate of change of the level of said liquid and the short-circuiting thereof on said resistor is decreased during the period of the rise of said plunger as a function of the magnitude of said impulses.

6. In a seismograph system comprising in circuit a detector adapted to generate electric impulses, an amplifier adapted to amplify said impulses and a recorder adapted to record said impulses, a sensitivity controller comprising a housing adapted to hold a liquid conductor body, a plunger adapted for vertical motion within said housing, said plunger being buoyant in said liquid, locking means for maintaining said plunger immersed in said liquid, a resistor surrounded by said liquid and short-circuited thereby, said resistor shunting the seismograph circuit between the detector and the amplifier, relay means responsive to an impulse from the detector for releasing said locking means, whereby said plunger is permitted to rise through said liquid under the effect of buoyancy, brake means adapted for frictional contact with said plunger, and electrical relay control means responsive to the magnitude of the impulses originating in the detector for regulating the application of said brake means to the plunger, whereby the rate of rise of said plunger and the rate of change of the level of the liquid short-circuiting said resistor are varied during the period of the rise of said plunger as a function of the magnitude of said impulses.

EUGEN MERTEN.